(12) United States Patent
Bellows et al.

(10) Patent No.: US 9,224,560 B2
(45) Date of Patent: Dec. 29, 2015

(54) CIRCUIT BREAKER POSITION ADJUSTMENT SYSTEM

(71) Applicant: ROCKWELL AUTOMATION TECHNOLOGIES, INC., Mayfield Heights, OH (US)

(72) Inventors: Troy Micheal Bellows, Racine, WI (US); Krzysztof Adam Nowacki, Katowice (PL); Paul T. Krause, Fredonia, WI (US); Miroslaw Safian, Slaskie (PL); Jacek Tomasz Pochopien, Zywiec (PL); Todd Richard Sauve, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 103 days.

(21) Appl. No.: 14/077,032

(22) Filed: Nov. 11, 2013

(65) Prior Publication Data

US 2015/0129552 A1    May 14, 2015

(51) Int. Cl.
| | |
|---|---|
| H01H 1/64 | (2006.01) |
| H01H 1/66 | (2006.01) |
| H01H 9/02 | (2006.01) |
| H01H 9/06 | (2006.01) |
| H01H 13/00 | (2006.01) |
| H01H 19/04 | (2006.01) |
| H01H 19/08 | (2006.01) |
| H01H 21/00 | (2006.01) |
| H01H 33/53 | (2006.01) |
| H01H 33/02 | (2006.01) |
| H01H 33/72 | (2006.01) |
| H02B 1/32 | (2006.01) |

(52) U.S. Cl.
CPC .............. *H01H 33/53* (2013.01); *H01H 33/022* (2013.01); *H01H 33/72* (2013.01); *H02B 1/32* (2013.01)

(58) Field of Classification Search
CPC .............. H01H 1/64; H01H 1/66; H01H 9/02; H01H 9/06; H01H 13/00; H01H 19/04; H01H 19/08; H01H 21/00; H01H 69/00; H01H 71/00; H01H 71/02; H01H 71/0214; H01H 71/0221; H01H 71/0228; H01H 71/0264; H01H 3/00; H01H 73/06; H01H 73/10; H01H 85/165; H01H 2009/0044; H01H 2009/02; H01H 2009/0285; H01H 2009/04; H01H 2071/02; H01H 2071/0242; H01H 2071/0264; H01H 2071/0292; H01H 2223/00; H01H 2223/028; H01H 2233/03
USPC .......... 200/43.01, 43.11, 43.14–43.16, 43.19, 200/43.22
See application file for complete search history.

(56) References Cited

U.S. PATENT DOCUMENTS 6,423,913 B1 *  7/2002  Gupta et al. ............... 200/50.11

* cited by examiner

*Primary Examiner* — Edwin A. Leon
*Assistant Examiner* — Anthony R. Jimenez
(74) *Attorney, Agent, or Firm* — Fletcher Yoder, P.C.

(57) ABSTRACT

A system for adjusting the position of a circuit breaker is provided. The system allows for translation of the circuit breaker with respect to a support base and interfacing mechanisms, such as those that serve to switch the circuit breaker between its operative states. Adjustment is afforded by an adjustment plate fitted to the support base and that moves with the circuit breaker. Slots through the support base allow for movement of the plate and circuit breaker. A threaded member allows for continuous movement of the plate and circuit breaker for accurate positioning.

19 Claims, 9 Drawing Sheets

CIRCUIT BREAKER POSITION ADJUSTMENT SYSTEM

BACKGROUND

The present invention relates generally to the field of circuit breakers and actuation devices for circuit breakers. More particularly, the invention relates to a system for adjusting the position of a circuit breaker within an enclosure and with respect to other operating components.

Many applications exist in the industry for switching devices, including circuit breakers. In general, circuit breakers provide protection for wiring and various downstream components by limiting current from electrical sources, such as the power grid. In many industrial settings, three-phase breakers are used in which three-phase power is routed to a load through the circuit breaker hardware. The circuit breaker can be closed to complete the power path to downstream equipment, such as motor drives, switchgear, motor starters, and so forth. Upon occurrence of certain events, the circuit breaker may be caused to open, interrupting the current for all three phases. In most applications a manual reset is provided allowing operations personnel to re-close the circuit breaker after opening to re-enable the operation. In many applications, the circuit breakers may also be manually opened by actuation of a lever, knob or other interface hardware.

In many circuit breaker applications the circuit breaker module itself is housed in an enclosure, and an actuating assembly is mechanically coupled to the circuit breaker by various mechanisms. Due to variability in the positioning, tolerances, mechanical components, and so forth, certain adjustment may be required in the relative position of these within the enclosure. For example, circuit breakers are commonly moved upwardly or downwardly (or side-to-side depending upon their orientation) or certain hardware that interfaces with the circuit breaker may be similarly moved. This movement allows for more reliable operation due to improved alignment of the operating mechanisms. Heretofore available circuit breaker adjustment mechanisms, however, have allowed for very limited movement, and in ways that did not provide continuous or fine adjustment. Moreover, certain adjustment mechanisms in the past have allowed inadvertent changes to the positioning over time or with movement or operation of the enclosure or mechanisms.

There is a need, therefore, for improved designs for use in circuit breaker applications that can address such drawbacks.

BRIEF DESCRIPTION

The present disclosure relates to systems and techniques designed to respond to such needs. In accordance with one aspect of the disclosure, a circuit breaker position adjustment system comprises an adjustment plate comprising apertures for receiving fasteners to attach the adjustment plate to a circuit breaker through a mechanical base. A continuous adjustment member interfaces with the mechanical base and the adjustment plate to provide position adjustment of the adjustment plate and circuit breaker with respect to the mechanical base by continuous movement of the adjustment member.

In accordance with another aspect, a circuit breaker position adjustment system comprises a mechanical base configured to hold a circuit breaker in an enclosure. An adjustment plate comprises apertures for receiving fasteners to attach the adjustment plate to a circuit breaker through the mechanical base. A continuous adjustment member interfaces with the mechanical base and the adjustment plate to provide position adjustment of the adjustment plate and circuit breaker with respect to the mechanical base by continuous movement of the adjustment member.

The disclosure also relates to a circuit breaker position adjustment system that comprises a circuit breaker, a mechanical base configured to hold the circuit breaker in an enclosure, and an adjustment plate comprising apertures for receiving fasteners to attach the adjustment plate to the circuit breaker through the mechanical base. A continuous adjustment member interfaces with the mechanical base and the adjustment plate to provide position adjustment of the adjustment plate and circuit breaker with respect to the mechanical base by continuous movement of the adjustment member.

The techniques set forth in the present disclosure also provide an electrical system, such as a motor control center, that includes one or more circuit breakers and the related positioning system as disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
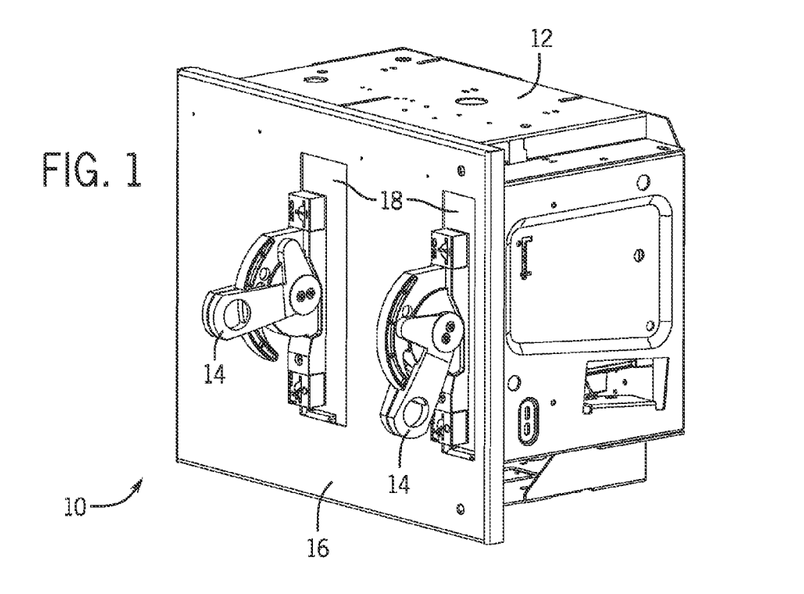
FIG. 1 illustrates an exemplary circuit breaker assembly in an enclosure as might be used in connection with industrial equipment.

FIG. 1 illustrates an exemplary circuit breaker assembly 10 that utilizes components and features that are in accordance with the present disclosure. The circuit breaker assembly may be used in a wide range of settings, including industrial settings, commercial settings, and in various applications, such as manufacturing, material handling, transportation, process industries, and so forth. In many applications the circuit breaker assembly will be installed in an enclosure 12, and this enclosure or components included in this enclosure may be, in turn, installed in a larger enclosure and system. In certain industrial settings, for example, such circuit breaker assemblies may be installed in motor control centers (MCCs) used to control operation of one or more motors driven to perform automation tasks. In many of these applications operator handles 14, knobs, or similar mechanical devices will be provided to allow for opening and closing (and resetting) of the circuit breakers during normal operation. These will commonly be provided on or near an exterior surface of the enclosure to allow operation without opening the enclosure. For example, in the illustration of FIG. 1, the operator handles 14 protrude from a front panel 16 of the enclosure, such as through apertures 18.

It should be noted that the present disclosure is intended to extend to and enable the inclusion of circuit breakers and the related techniques disclosed incorporated into electrical equipment and systems, particularly MCCs. Detailed descriptions of such MCCs are provided in U.S. Pat. No. 8,553,395, entitled Motor Control Center Network Connectivity Method and System, issued on Oct. 8, 2013 to Blodorn, et al., and U.S. Pat. No. 8,420,935, entitled Bus Support System for a Motor Control Center, issued on Apr. 13, 2013 to Malkowski, Jr. et al., both of which are hereby incorporated into the present disclosure by reference. As will be appreciated by those skilled in the art, such systems typically include one or more enclosure sections, encased in a metal cabinet provided with a sealed door. The components of such systems are grouped into bays or drawers, and advantageously may be fairly densely packed. The present techniques allow for use of the circuit breakers in these systems, provide for withstanding the demanding applications associated with MCCs, particularly positioning and venting during operation, and where desired may enable a more dense packing than previous approaches.

Figure 2:
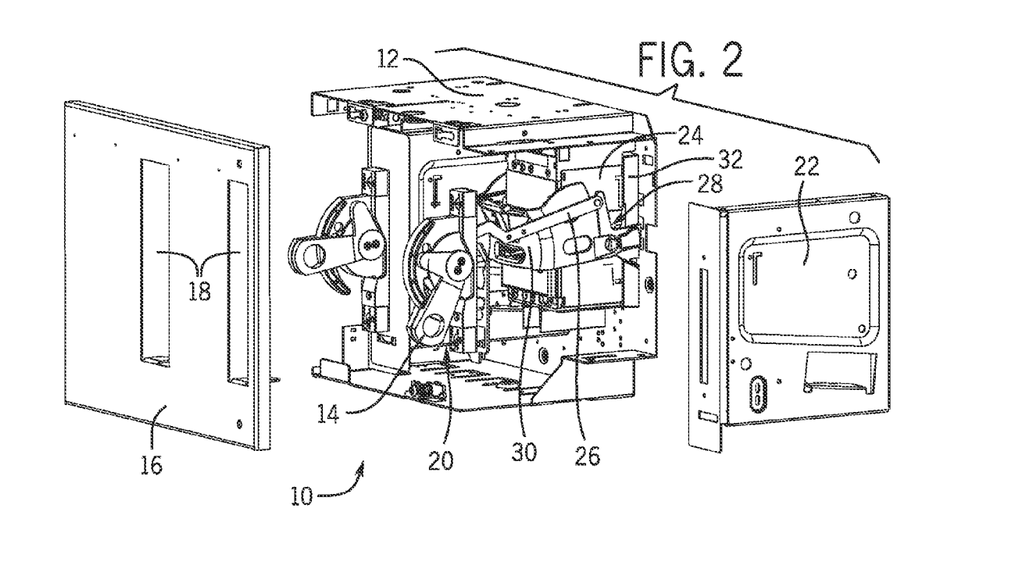
FIG. 2 is an exploded view of the same assembly with a front panel and side panel removed to reveal a circuit breaker and certain of the operating mechanisms.

FIG. 2 illustrates the same exemplary arrangement in an exploded view. In this view, the handle assemblies 20 are illustrated with the handles 14 for two circuit breaker assemblies shown in different positions. A side panel 22 has also been removed to expose the circuit breaker 24 itself, along with an actuating linkage 26 and operating assembly 28 for opening and closing the circuit breaker by movement of the operator handle 14. It should be noted that in this view certain components have been removed for clarity, such as biasing springs used to bias the mechanism in a desired position. The actuating linkage 26 is mechanically coupled to the operator handle 14 and may be pushed or pulled by movement of the operating handle to move the circuit breaker operating assembly between its opened and closed positions. In the illustrated embodiment the operating assembly 28 includes a bail 30 and a base 32 that are linked together and that interface with the circuit breaker as described below to open and close the circuit breaker. Various linkages and mechanical structures may be devised for actuating the bail and thereby circuit breaker, and the particular construction and arrangement of these is generally beyond the scope of the present disclosure.

Figure 3:
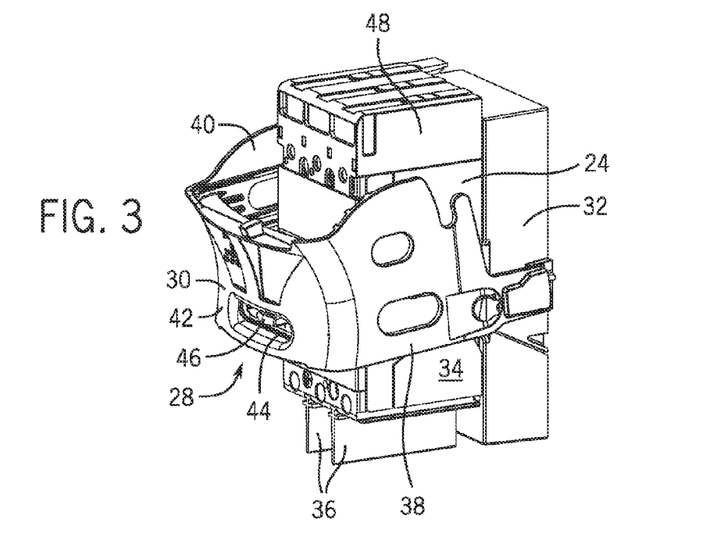
FIG. 3 is a perspective view of an exemplary circuit breaker of the type shown in FIG. 2 illustrating an exemplary operating assembly, and cover as disclosed herein.

FIG. 3 illustrates the circuit breaker 24 removed from the enclosure and disconnected from the operating linkage and other mechanisms. In this exemplary embodiments, the circuit breaker itself comprises a housing 34 that receives power from a power source (e.g., the power grid) and that provides power to a load (e.g., a motor). In particular, in this embodiment line-side connections are made in an upper portion of the circuit breaker, and load-side connections are made in a bottom portion of the circuit breaker. The load-side connections are separated by phase separators 36. Similar separations are made on the line side.

The operating assembly 28 here comprises the bail 30 and a base 32 which is connected to and pivotally supports the bail. The base 32 allows for mounting and securely holding the circuit breaker in place, while the bail allows for switching the circuit breaker between its operative positions. In the illustrated embodiment, the circuit breaker has several operative states, including "on", "off", "tripped", and "reset". The bail and the base are made of an insulative plastic material, typically molded into their final shapes. In accordance with presently contemplated embodiments, the bail and the base are made of the same molded plastic material, and each generally comprise a single piece of molded material. Suitable materials for the bail may include, for example, a glass filled polyacrylamide, such as Ixef 1022, although other materials may also be used. Suitable materials for the base may include a polyethylene terephthalate (PET), such as Rynite FR945. As used herein, the term "insulative" connotes that the material will not conduct charge when exposed to or contacted by a potential difference, such as hot gas or ionized material vented by the circuit breaker during operation.

The illustrated bail comprises sides 38 and 40 that approximately enclose the circuit breaker, as well as a front side 42. A slot 44 is formed in the front side and receives a toggle lever 46 extending from the circuit breaker that enables the bail to move the toggle lever when the bail is rotated with respect to the base, thereby switching the circuit breaker between its operative states. A gas directing cover 48 is provided on an upper side of the circuit breaker, in the illustration of FIG. 3, and allows for directing and venting gasses produced upon opening of the circuit breaker. The gas directing cover also houses terminals for connecting three phases of line power to the circuit breaker.

Figure 4:
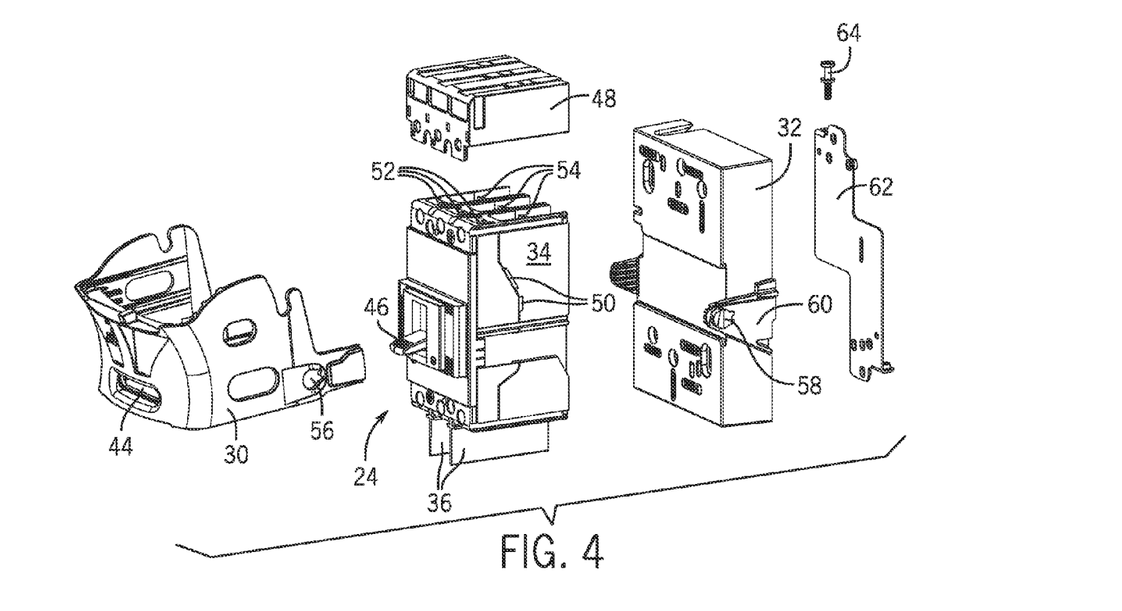
FIG. 4 is an exploded view of the same circuit breaker assembly illustrating various operating, gas directing, and position adjusting components.

FIG. 4 illustrates the same arrangement in exploded perspective. Here the bail 30 has been removed from the base 32 and its sides, general shape, and slot 44 can be seen. The cover 48 has also been exploded upwardly to reveal the upper components of the circuit breaker. In the illustration of FIG. 4, vents can be seen that allow gas to escape from the circuit breaker during operation. As will be appreciated by those skilled in the art, such gasses typically include ionized particles and plasma that is eventually cooled, but that that may be generally conductive as it exits the device. In the illustration of FIG. 4, for example, side vents 50 can be seen as well as upper vents 52. The upper vents 52 generally allow for gas to escape from each separated phase section within the circuit breaker. The provision of the insulative plastic bail 30 allows for the escape of such conductive gasses from vents 50 and from any other vents around the circuit breaker without transmitting charge to a conductive moving part (the bail and the base being non-conductive).

Beneath the cover 48, in the illustration of FIG. 4, can be seen also the line-side terminals 54. Multiple entry points and forms of connection can be provided for connecting phase conductors to these terminals.

Also in the embodiment illustrated in FIG. 4, a pivot aperture 56 is seen on a near side of the bail 30, with a similar aperture being provided on the opposite side. The pivot apertures allow the bail to pivot on protruding pivot pins 58 of the base that are provided on extensions 60.

Moreover, in the illustration of FIG. 4, an adjustment plate 62 can be seen exploded from a rear of the base 32. As discussed in greater detail below, this adjustment plate allows the circuit breaker to be fitted loosely to the base, and then adjusted in a position (e.g., upwardly and downwardly) to improve its position with respect to other actuating components. The adjustment plate 62 operates with an adjustment screw to provide the desired continuous adjustment of the circuit breaker position.

Figure 5:
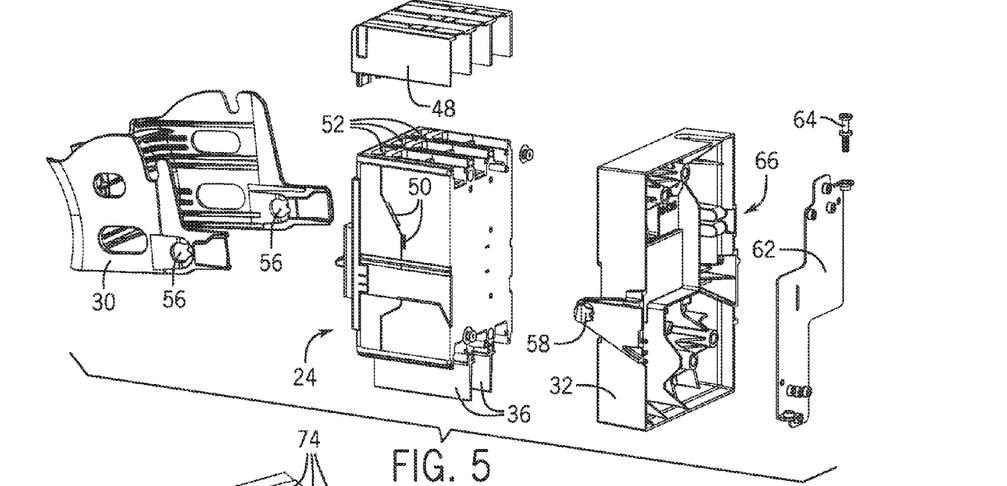
FIG. 5 is a similar rear exploded perspective view of the device.

These same components are further illustrated in FIG. 5. Here, the bail is again exploded from the base, with pivot apertures 56 being visible that interface with corresponding pivot pins 58 of the base. The upper gas vents 52 are further seen beneath the cover 48. The adjustment plate 62 and threaded adjustment screw 64 are shown exploded from a rear side 66 in which they are lodged during assembly and operation.

Figure 6:
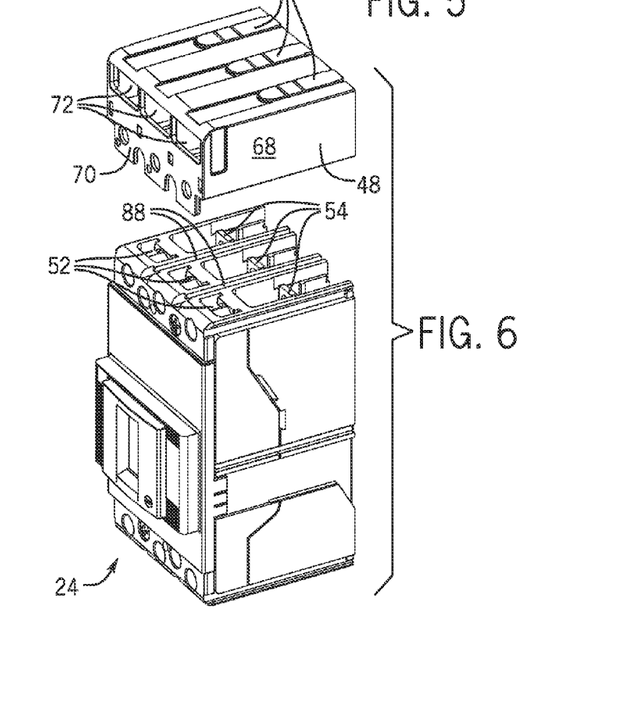
FIG. 6 is an exploded view of the same circuit breaker with an exemplary gas-directing cover.
Figure 7:
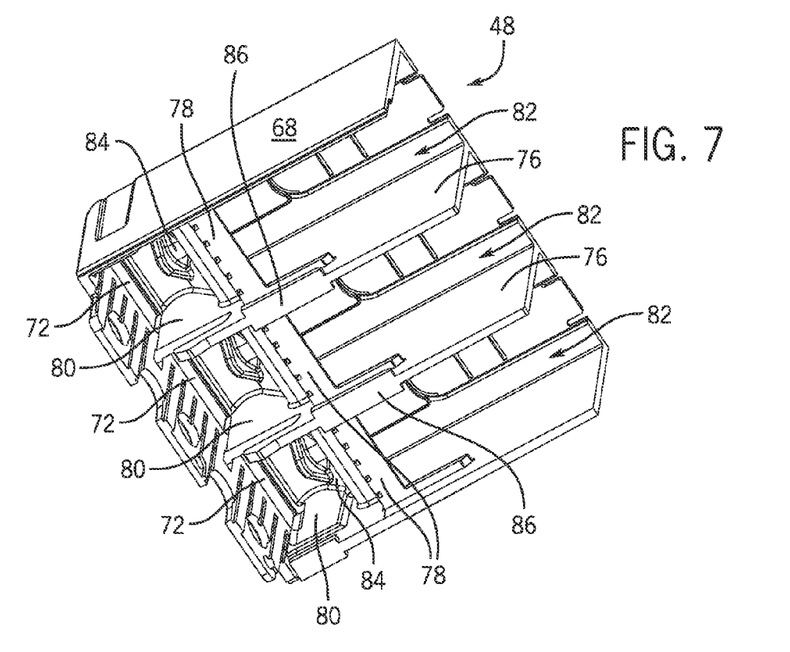
FIG. 7 is a bottom perspective view of the gas-directing cover.
Figure 8:
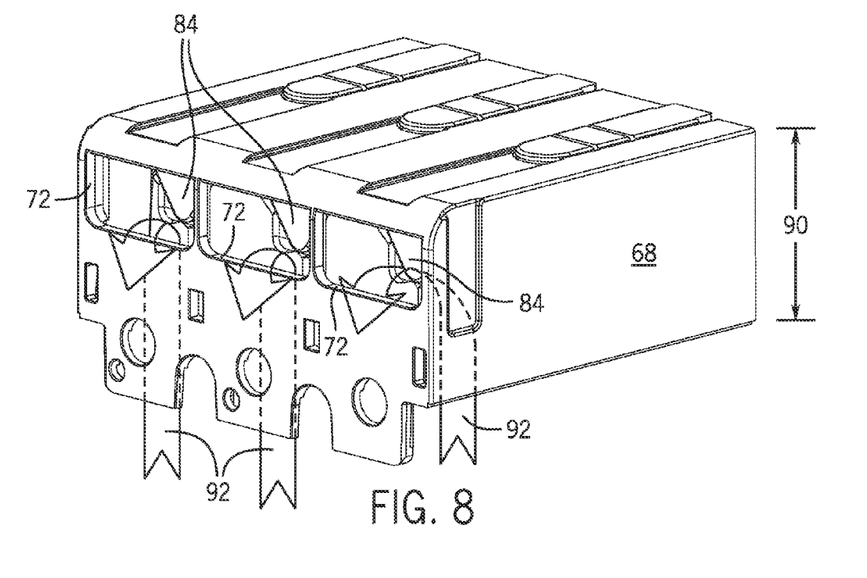
FIG. 8 is a top perspective view of the gas-directing cover.

FIGS. 6, 7 and 8 illustrate details of an exemplary embodiment of the gas directing cover 48 designed to fit on the circuit breaker and to direct gas vented upon opening of the breaker. As shown in FIG. 6, the cover comprises a housing 68 which is made of an insulative plastic material, such as a fiberglass filled flame retardant Nylon 66. The cover fits over both the upper vents 52 and the terminals 54 of the circuit breaker. A front side 70 of the cover is traversed by venting apertures 72 that allow hot gasses and conductive material to vent from each of the separate phases of the circuit breaker upon opening. The cover of the circuit breaker may be provided with knockouts 74 which are panels or regions bordered by weakened or thinner areas that allow certain portions to be easily removed where wiring is made through the cover. Alternatively, conductors may be passed through a backside of the cover opposite the front 70. When provided, the knockouts will provide openings having a width of approximately 12 mm.

The internal configuration of the cover is best illustrated in FIG. 7. Here again, the cover 48 comprises a plastic insulative housing 68 with sections for each electrical phase. The sections are formed by phase separation partitions 78 which extend longitudinally along the housing. Gas directing partitions 78 are formed transversely to these phase separation partitions. The resulting internal structure effectively defines venting sections 80 on a side of the gas directing partitions nearest the apertures 72, and phase terminal sections 82 on an opposite side of the gas directing partitions. In the illustrated embodiment, then, gasses that vent from the circuit breaker upon opening are confined within the venting sections 80, and each venting section is separated from neighboring venting sections by the phase separation partitions. This allows for gas to vent only through the apertures 72 and not rearwardly toward the terminals. Moreover, gas diverting structures 84 may be integrally formed within each venting section to control the flow and pressure of the gas when venting. In a presently contemplated embodiment, for example, the configuration of the venting sections, including the partitions, the diverting structures and the apertures allow for an increase in the gas pressure (i.e., back pressure) that confines the gas and limits the rate of increase of pressure in the atmosphere surrounding the circuit breaker when venting. This may effectively limit the rate of rise of pressure within the enclosure, confining the gas as it escapes to the restricted volumes of the circuit breakers and the venting sections until all gas pressure has been equalized.

The cover is designed to fit snuggly on the circuit breaker by virtue of the phase separation partitions 76 and tabs 84 formed at their lower extremity. These tabs may slip within grooves 88 (see FIG. 6) formed between the phase sections of the circuit breaker. The resulting structure provides for containment of venting gas, direction of the gas, control of the gas pressure, and separation of the venting sections from the phase terminal sections.

As illustrated in FIG. 8, a venting gas is redirected generally along a 90 degree redirection path from an upper direction in the figure outwardly through the apertures 72, as indicated by arrows 92. This redirection is aided by the diverting structures 84. By virtue of the re-direction, gas containment, and gas separation, the cover may be made in a very low profile as compared to existing circuit breaker vent arrangements. Dimension 90 represents the height of the cover above the height of the circuit breaker. In presently contemplated embodiments, the height 90 may be on the order of 25 mm, while without the cover a spacing of approximately 100 mm would have been required. This reduced height allows the circuit breaker and the overall assembly to be placed in smaller and more densely packed arrangements within enclosures.

Figure 9:
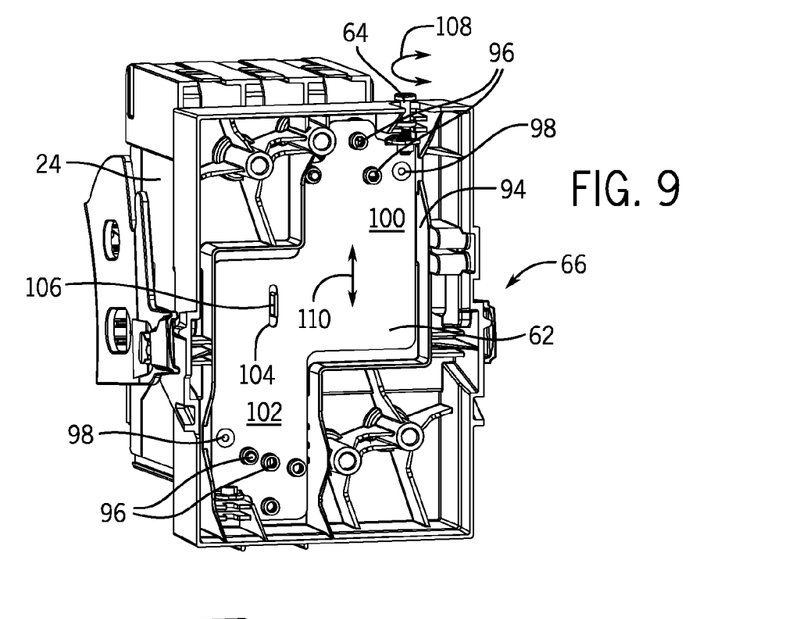
FIG. 9 is a rear view of a mounting base with an adjustment system installed for adjusting position of the circuit breaker with respect to support, mounting and operating hardware.
Figure 10:
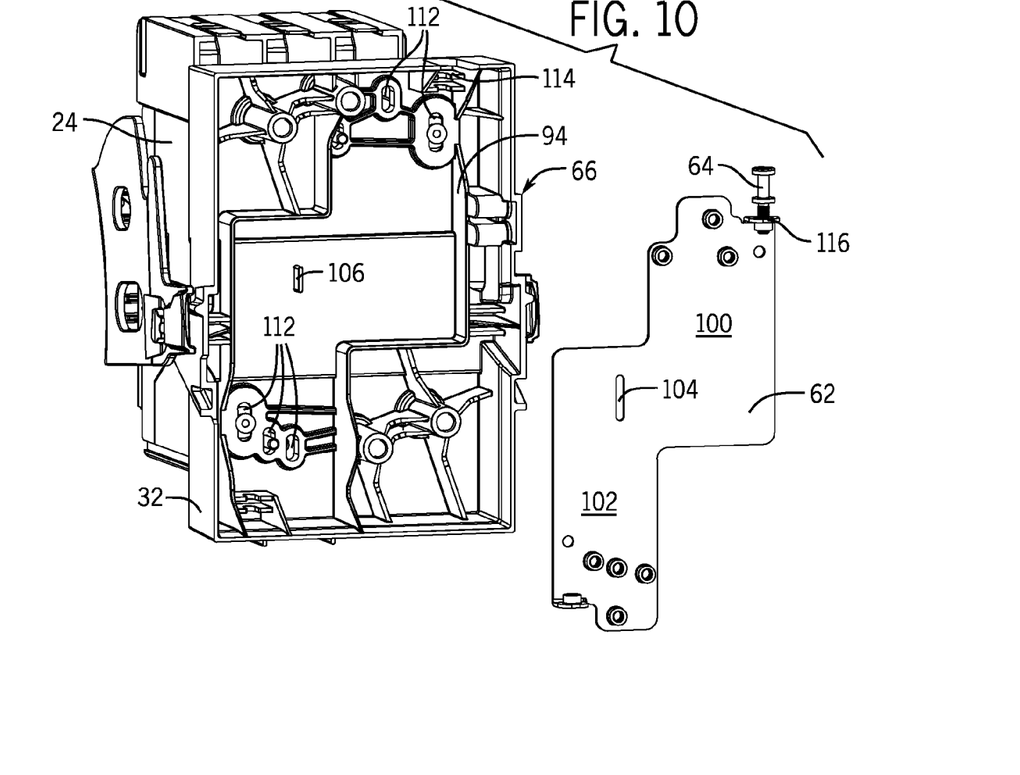
FIG. 10 is a rear perspective view of the same arrangement with an adjustment plate exploded from the base to illustrate its features.

A presently contemplated arrangement for the adjustment of the position of the circuit breaker is illustrated in FIGS. 9 and 10. As discussed above, an insulative base 32 allows for mounting of the circuit breaker and the bail. The circuit breaker, however, may need to be adjusted in position relative to this base and bail. To allow for such adjustment, the adjustment plate 62 is provided in a rear recess 94 of the base. Fasteners 96 extend through the adjustment plate and traverse the base, and are fastened to the circuit breaker housing. Certain of these fasteners may allow for initial fixation of the adjustment plate to the base, such as rivets 98. Other fasteners will typically include screws that extend through the adjustment plate and the base, and into the corresponding apertures provided in the circuit breaker housing.

The adjustment plate in the illustrating embodiment is generally Z-shaped so as to provide good support on either side of a centerline of the circuit breaker. In the illustrated embodiment, an upper portion 100 of the adjustment plate supports the circuit breaker to one side of the centerline, while a lower portion 102 supports the circuit breaker on an opposite side. Features may be provided in the adjustment plate and the base to afford alignment and to maintain alignment as the plate and circuit breaker, together, are moved with respect to the base and bail. In the illustrated embodiment, for example, an alignment slot 104 is provided in the adjustment, while a corresponding alignment protrusion 106 extends from the base. These structures are illustrated both in FIGS. 9 and 10.

Adjustment of the position of the circuit breaker proceeds as follows. Initially, the circuit breaker is mounted on the base in which the adjustment plate 62 will typically already have been installed by means of rivets 98. These rivets, however, fit sufficiently loosely to allow for translational movement of the plate for respect to the base. The circuit breaker is mounted to the base by installation of fasteners through the apertures provided in the base and adjustment plate, as best illustrated in FIG. 10. With the circuit breaker mounted, but somewhat loosely, the continuous adjustment member in the form of the threaded fastener 64 may be adjusted to move the adjustment plate and circuit breaker together upwardly and downwardly with respect to the base and bail. In the illustrated embodiment the rotational movement of the adjustment fastener 64 is illustrated by arrow 108 in FIG. 9, which results in translational motion as indicated by arrow 110. To allow translation, the apertures through which all of the fasteners pass through the base are slotted as indicated by reference numeral 112 in FIG. 10. The continuous adjustment is afforded by a shoulder or tab 114, or multiple shoulders or tabs formed in the base, and a corresponding tab 116 in the adjustment plate. Thus, rotation of the fastener allows for continuous upward and downward translation of the adjustment plate along with the circuit breaker with respect to the base and bail. Once these components are in a desired position, all of the fasteners may be tightened to lock the components into their desired position or relationship. In the event that any subsequent changes are desired, this procedure may be repeated by simply loosening the fasteners, adjusting the continuous adjustment fastener 64, and re-tightening the mounting fasteners.

Figure 11:
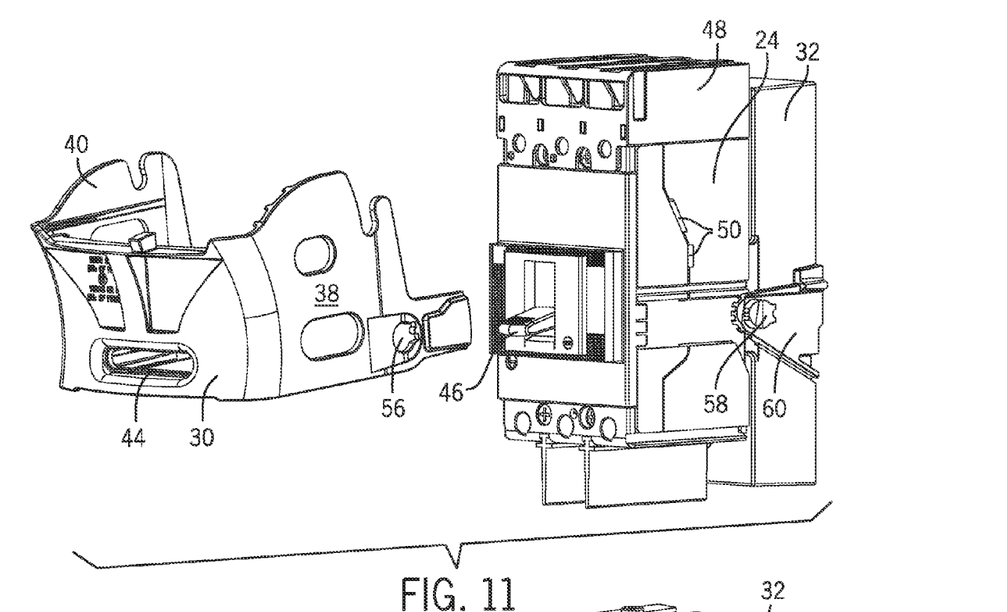
FIG. 11 is an exploded view of an exemplary operating system including a bail, a base, and the interposed circuit breaker.
Figure 12:
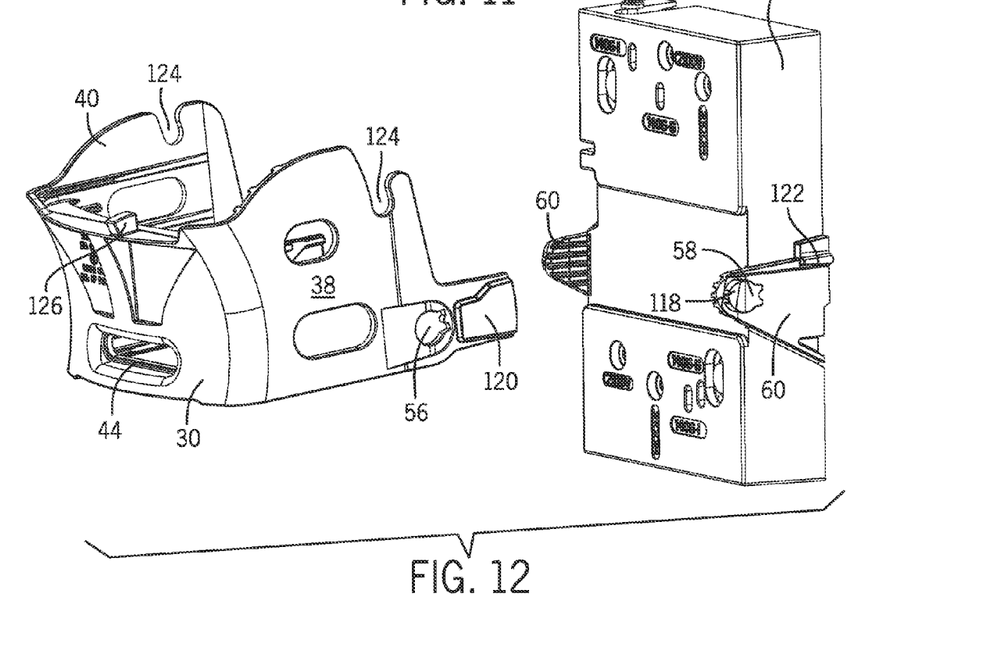
FIGS. 12 and 13 illustrate the exemplary bail and base illustrated in FIG. 11.
Figure 13:
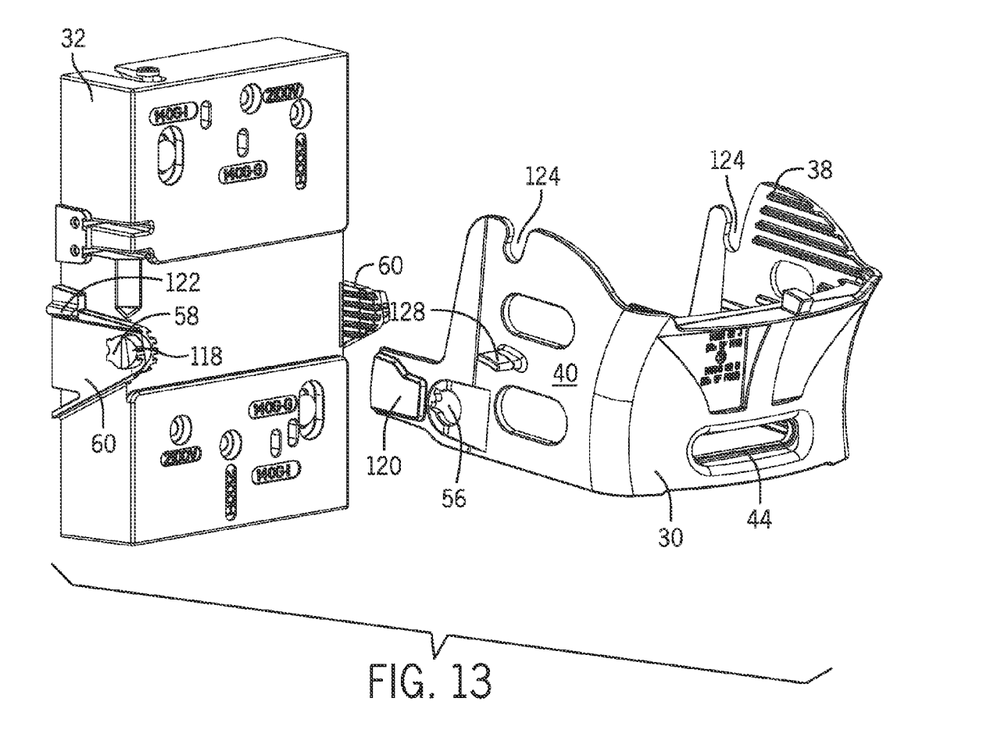

A presently contemplated embodiment for the bail and base components is illustrated in FIGS. 11-13. As noted above, the bail 30 comprises a slot 44 that receives the toggle lever 46 for operation of the circuit breaker. Sides 38 and 40 may bound or partially surround the circuit breaker and particularly the vents 50 on the sides of the circuit breaker. Venting gas will have no detrimental effect, particularly in view of the insulative material of which the bail and base are made. Here again, as noted above, pivot apertures 56 are shown in the sides of the bail, and these interface with the pivot pins 58 of the base. In the illustrated embodiment, inclines 118 are formed on each of these pins to allow a recess 120 at corresponding locations on the bail to be slid over the pin, deforming the sides of the bail slightly until the bail snaps into engagement on the base. To limit nuisance movement of the bail in respect to the base, one or more movement resisting features may be provided, such as protrusions or bosses 122 (see FIGS. 12 and 13).

In the illustrated embodiment, another feature of the bail includes the formation of integral linkage slots 124 that receive the actuating linkage discussed above (see e.g., FIG. 2). In the illustrated embodiment these are provided in symmetrical locations on both sides of the bail to allow for linkages to be provided in one or both locations. The bail may also include protrusions or features designed to allow for actuation of auxiliary features. These are illustrated, for example, in the form of a protrusion 126 in FIG. 12 and a side protrusion 128 in FIG. 113. As will be appreciated by those skilled in the art, auxiliary switches (removed for clarity) may be mounted to the circuit breaker itself, or to the base, or to any surrounding structure and may be used to provide a confirmation signal of the operational state of the circuit breaker by reference to the position of the bail. Thus, as the bail is raised or lowered, the protrusions 126 and 128 may actuate (close) and de-actuate (open) one or more auxiliary switches.

Figures 14, 15:
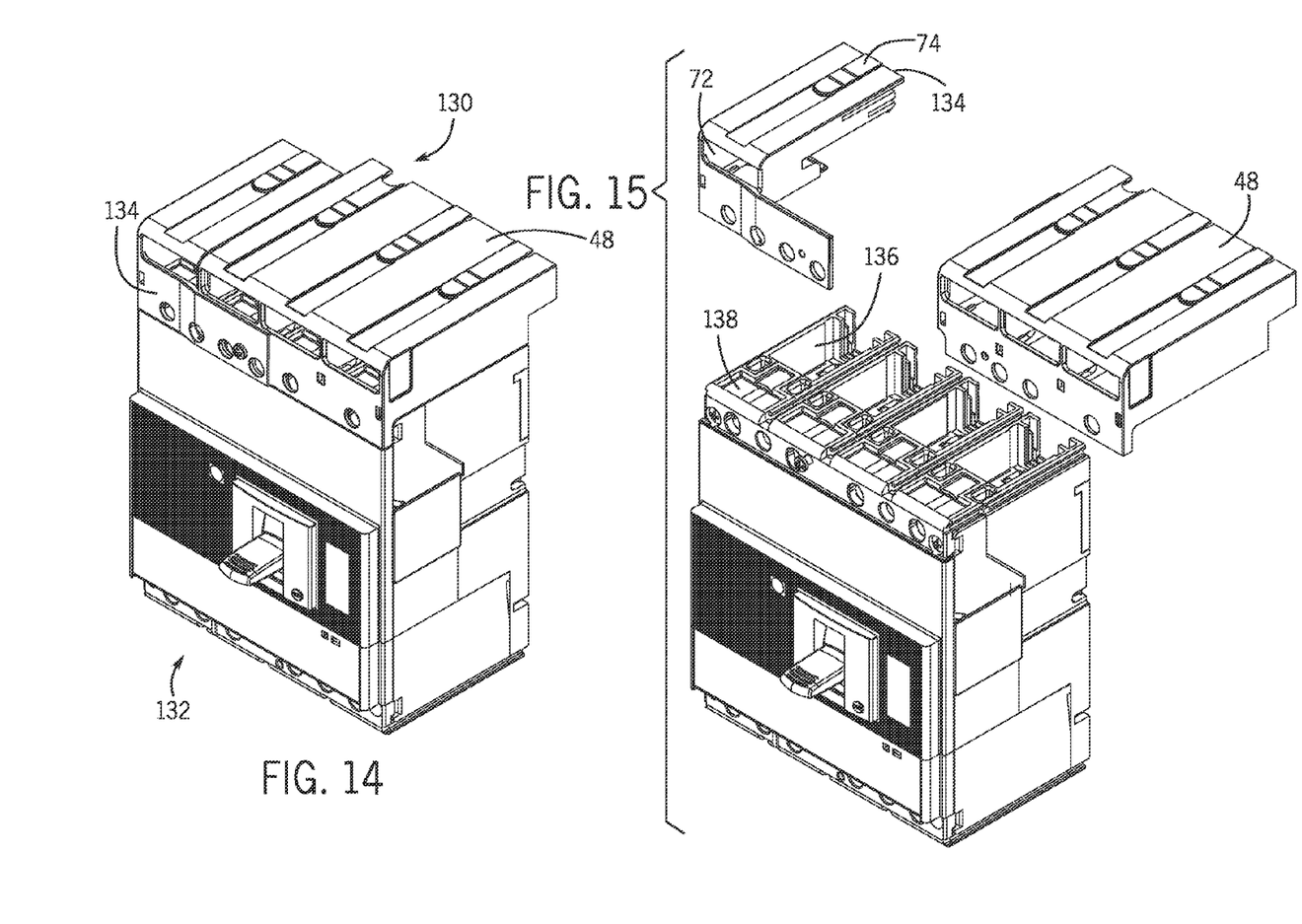
FIGS. 14-16 illustrate an alternative embodiment of a gas directing circuit breaker cover designed for a 4-pole circuit breaker.
Figure 16:
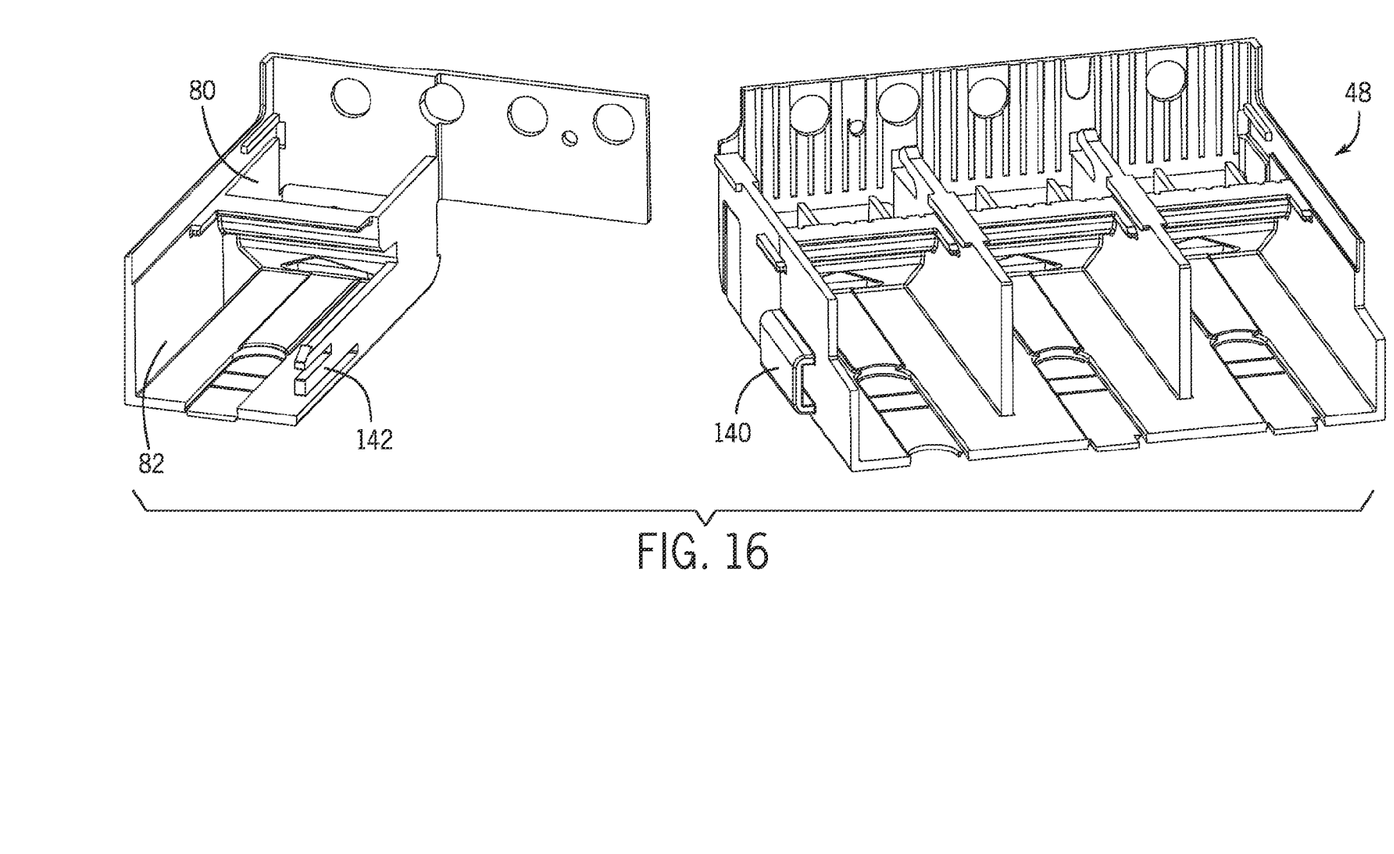

Among the various alternative structures and systems that the foregoing techniques enable is a 4-pole version of the cover (and other operating components). FIGS. 14-16 illustrate a presently contemplated embodiment for a gas directing cover designed for 4-pole circuit breakers. As seen in FIG. 14, 4-pole gas directing cover 130 may be fitted to a 4-pole circuit breaker 132, the breaker being constructed in a similar manner to the 3-pole version illustrated in the preceding figures, but wider, with the additional pole positioned adjacent to the first three. In this configuration, the 4-pole gas directing cover 130 may comprise the 3-pole cover 48 supplemented by an add-on extension 134. Similar structures are provided in this extension, along with the same gas separation and directing features and functionality as in the 3-pole embodiment. As shown in FIG. 15, the extension may include a gas venting aperture 72, and knockouts 74 on a terminal side. The cover will fit over the terminal section 136 and the venting aperture 138 of the additional pole, and operate as the other cover structures will, as described above. As shown in FIG. 16, to facilitate mounting and operation of the extension, a mechanical receiver 140 may be formed on the 3-pole cover 48 that receives corresponding tabs 142 of the extension. This arrangement enables the two bodies to be joined securely to one another, allows the end wall of the 3-pole cover to serve as a separator, and allows the same 3-pole cover to serve for both 3-pole applications and 4-pole applications without otherwise altering the structure of the 3-pole cover or requiring manufacture of different 3-pole versions.

CONCLUSION

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A circuit breaker position adjustment system, comprising:
   an adjustment plate comprising apertures for receiving fasteners to attach the adjustment plate to a circuit breaker through a mechanical base; and
   a continuous adjustment member that interfaces with the mechanical base and the adjustment plate to provide position adjustment of the adjustment plate and circuit breaker with respect to the mechanical base by continuous movement of the adjustment member, wherein the continuous adjustment member comprises a threaded member configured to be received by a portion of the mechanical base and extend through a corresponding facing portion of the adjustment plate.

2. The system of claim 1, wherein the adjustment plate apertures comprise generally round holes and adjustability with respect to the mechanical base is provided by slots in the mechanical base corresponding in location to the adjustment plate apertures.

3. The system of claim 1, wherein the adjustment plate is configured to be generally fixed in location with respect to the circuit breaker.

4. The system of claim 1, wherein the adjustment plate is made of metal.

5. The system of claim 1, wherein the adjustment plate comprises an alignment feature that interfaces with the mechanical base, when installed thereon, to maintain alignment with the mechanical base.

6. A circuit breaker position adjustment system, comprising:
   a mechanical base configured to hold a circuit breaker in an enclosure;
   an adjustment plate comprising apertures for receiving fasteners to attach the adjustment plate to a circuit breaker through the mechanical base; and
   a continuous adjustment member that interfaces with the mechanical base and the adjustment plate to provide position adjustment of the adjustment plate and circuit breaker with respect to the mechanical base by continuous movement of the adjustment member, wherein the continuous adjustment member comprises a threaded member configured to be received by a portion of the mechanical base and extend through a corresponding facing portion of the adjustment plate.

7. The system of claim 6, wherein the adjustment plate apertures comprise generally round holes and the mechanical base comprises slots corresponding in location to the adjustment plate apertures.

8. The system of claim 7, wherein the adjustment plate is configured to be fixed to the circuit breaker by fasteners extending through the adjustment plate apertures and through the mechanical base slots.

9. The system of claim 6, wherein the adjustment plate is made of metal.

10. The system of claim 6, wherein the adjustment plate comprises an alignment feature that interfaces with the mechanical base, when installed thereon, to maintain alignment with the mechanical base.

11. The system of claim 10, wherein the alignment feature comprises a slot in which a protrusion from the mechanical base slides during adjustment.

12. The system of claim 6, wherein the adjustment plate is generally planar.

13. The system of claim 6, wherein the adjustment plate is generally Z-shaped and the apertures are located to provide upper and lower support to the circuit breaker on both sides of a centerline of the circuit breaker.

14. A circuit breaker position adjustment system, comprising:
- a circuit breaker;
- a mechanical base configured to hold the circuit breaker in an enclosure;
- an adjustment plate comprising apertures for receiving fasteners to attach the adjustment plate to the circuit breaker through the mechanical base; and
- a continuous adjustment member that interfaces with the mechanical base and the adjustment plate to provide position adjustment of the adjustment plate and circuit breaker with respect to the mechanical base by continuous movement of the adjustment member, wherein the continuous adjustment member comprises a threaded member configured to be received by a portion of the mechanical base and extend through a corresponding facing portion of the adjustment plate.

15. The system of claim 14, wherein the adjustment plate apertures comprise generally round holes and the mechanical base comprises slots corresponding in location to the adjustment plate apertures.

16. The system of claim 15, wherein the adjustment plate is configured to be fixed to the circuit breaker by fasteners extending through the adjustment plate apertures and through the mechanical base slots.

17. The system of claim 14, wherein the adjustment plate is generally planar, and is fitted within a recess in a rear side of the mechanical base opposite the circuit breaker.

18. The system of claim 14, wherein the adjustment plate is generally Z-shaped and the apertures are located to provide upper and lower support to the circuit breaker on both sides of a centerline of the circuit breaker.

19. A circuit breaker position adjustment system, comprising:
- a mechanical base configured to hold a circuit breaker in an enclosure;
- an adjustment plate comprising apertures for receiving fasteners to attach the adjustment plate to a circuit breaker through the mechanical base, wherein the adjustment plate is generally Z-shaped and the apertures are located to provide upper and lower support to the circuit breaker on both sides of a centerline of the circuit breaker; and
- a continuous adjustment member that interfaces with the mechanical base and the adjustment plate to provide position adjustment of the adjustment plate and circuit breaker with respect to the mechanical base by continuous movement of the adjustment member.

* * * * *